INVENTORS.
David W. Burgoon
Emil J. Ciabattari
BY
Soans, Anderson, Luedeka, & Fitch
Attys.

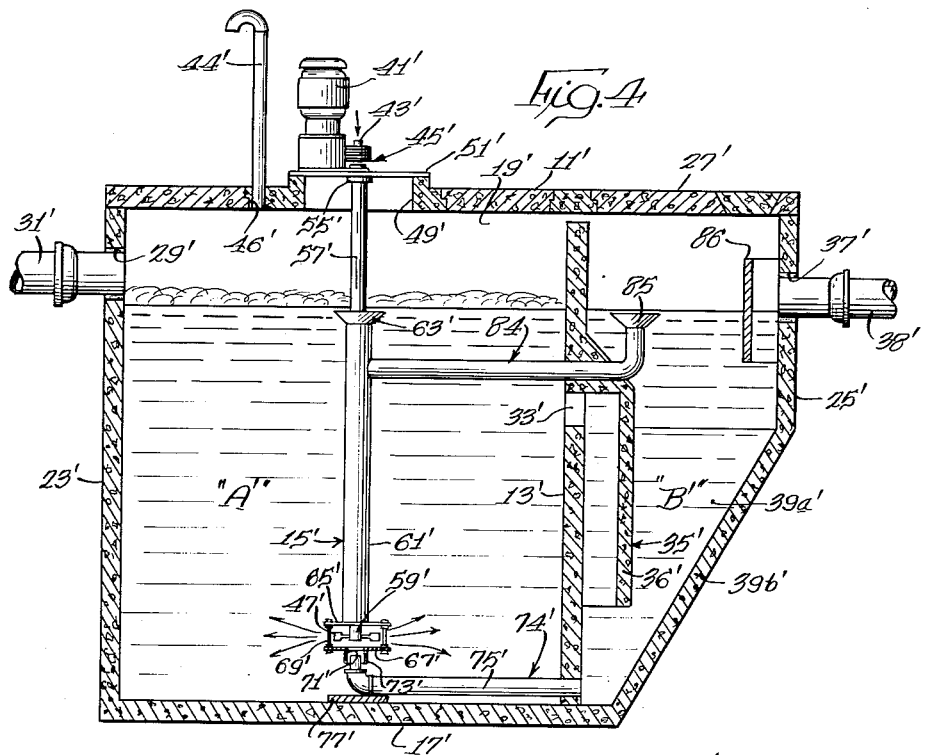
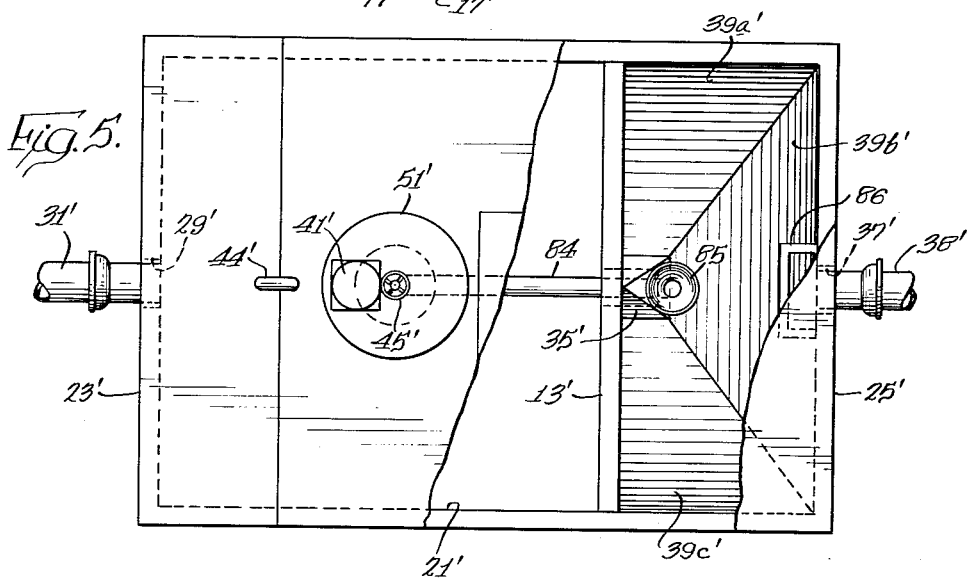

United States Patent Office 2,987,186
Patented June 6, 1961

2,987,186
APPARATUS FOR TREATING WASTE MATERIALS
David W. Burgoon, Winnetka, and Emil J. Ciabattari, Chicago, Ill., assignors to Yeomans Brothers Company, Melrose Park, Ill., a corporation of Delaware
Filed Nov. 21, 1957, Ser. No. 697,835
3 Claims. (Cl. 210—197)

The present invention relates to the treatment of waste materials, and it is particularly directed to an improved means for the handling of relatively small quantities of waste materials, such as is encountered in homes, motels, etc., which are not serviced by municipal sewage systems.

In the absence of a sewage treatment plant, it is necessary to install septic tanks or other means to handle the sewage and other waste materials. In handling the waste materials in a septic tank, the sludge, which results from the settling of the solids in the fluid waste material, is allowed to remain in the septic tank for a sufficient time so that anaerobic decomposition of the waste material occurs. However, the operation of the septic tank requires time and under load conditions may pass effluent which still contains harmful matter. Large septic tanks, of course, are more expensive and require larger areas for installation.

There are municipal or other governmental requirements and regulations which usually require that a substantial area be provided to assure complete assimilation of septic tank effluent. Not infrequently, these regulations require that there be not more than one family size septic tank and associated tile field for each half-acre or more of land. This increases construction expense and may seriously restrict normal building development and use of land areas.

Other available means for treating waste materials in small amounts are either less efficient than the septic tank method of treatment, are prohibitively expensive, or are not accepted by governmental authorities.

There is an existing need for an efficient, economical and practical waste treating means adapted for handling the waste materials from one and two family dwellings. Especially is there a need for such a means which is more efficient than the septic tank process, which does not need expensive underground tile fields or other arrangements for effluent disposal, and which, at the same time, is capable of being manufactured and installed at a reasonable cost.

The primary object of the present invention is to provide improved means for handling waste materials and particularly sewage from small dwelling units.

A further object of the invention is to provide apparatus for handling waste material in accordance with this discovery, thereby to make possible a highly effective, yet economical, waste treating apparatus for use in treating daily waste produced in the average home or other small living unit.

Another object of the invention is to provide means for treating sewage and other waste in a single, compact unit in a manner which produces a clear, essentially harmless effluent that may be drained directly into the soil or otherwise disposed of without additional handling or treatment. Still another object is to provide a means of the type referred to which employs an aeration treatment of the solid waste materials, in order to convert them into unobjectionable products which are likewise disposable without substantial further treatment.

Other objects and advantages of the present invention will be noted with respect to the disclosure of the selective embodiment illustrated in the accompanying drawings wherein:

FIGURE 4 is a side elevational view generally similar to that shown in FIGURE 1 illustrating another embodiment of the invention; and FIGURE 5 is a plan view of the apparatus shown in FIGURE 4 with portions broken away to illustrate certain details of construction, and is generally similar to FIGURE 2.

Figure 1:
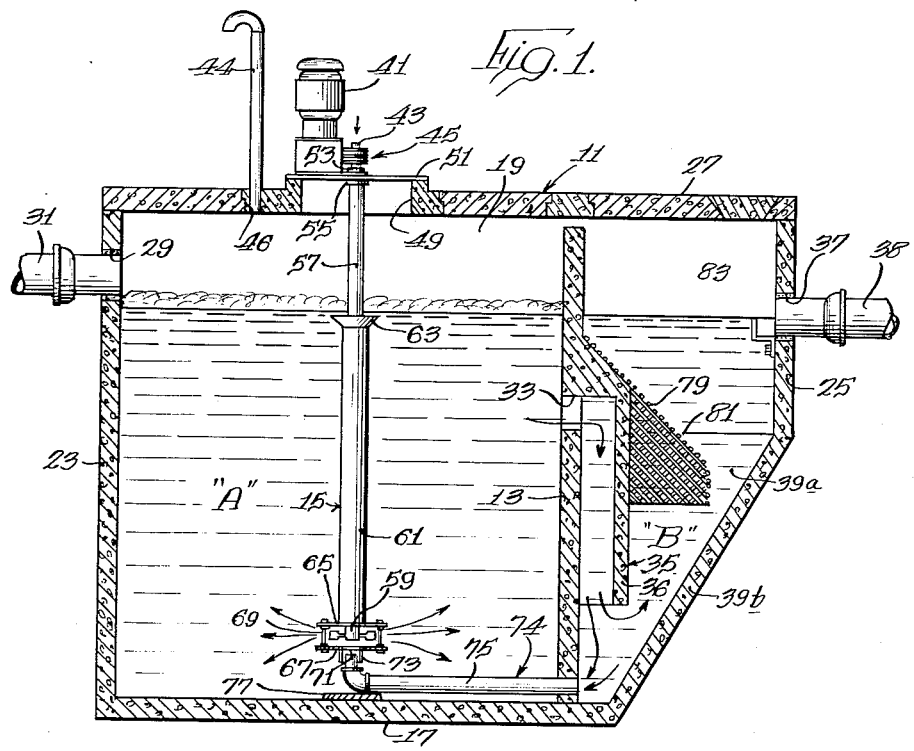
FIGURE 1 is a side elevation, partly in section, of apparatus in accordance with the present invention.

The present invention is based, in part, on the discovery of certain improved treating apparatus and processes which make possible the successful aerobic treatment of small volumes of waste materials by the use of much smaller amounts of air per pound of biologically active waste material than has heretofore been attainable.

One method of treating sewage including liquid and solid waste material is disclosed in our co-pending application Serial No. 551,053, filed December 5, 1955, of which the present application is a continuation in part. The method and apparatus set forth in our earlier filed co-pending application has proved very successful. The present application relates to certain improvements in the invention disclosed in this earlier application.

As previously noted, the disposal of liquid borne waste materials, such as sewage, laundry drainage, ground garbage and the like in localities where there is no sewage treatment plant or other commercial disposal means, presents a number of very serious problems. The septic tank is not wholly adequate to handle such problems.

The present invention offers an improved replacement for the septic tank type of waste treatment. Generally, the improved results noted with this invention are achieved through the provision of a highly effective means for affording aerobic treatment of small quantities of waste materials, while at the same time providing means for anaerobic treatment if desired. The treatment produces innocuous effluent. The liquid effluent is clear and of such low biological oxygen demand that it may be safely dumped into streams and water courses without further treatment.

With reference to the drawings, it will be seen that apparatus chosen to illustrate the principle of this invention comprises generally a tank 11 including a wall or baffle 13 therein defining a treating compartment or zone "A" and a settling compartment or zone "B." A power operated aerating means 15 is provided for introducing air into the treating zone "A" at a position below the level of the liquid therein.

The tank 11 is made of suitable material, such as concrete or steel, and in the illustrated form includes a bottom 17, a pair of side walls 19 and 21, and a pair of end walls 23 and 25, the walls and bottom defining a generally rectangular tank. A top 27, comprising a series of concrete slabs in the illustrated embodiment, is also provided for the tank in order to thereby make a substantially closed structure. Suitable manholes or access openings may be provided in the top to permit servicing of the unit. A fluid inlet is provided by an opening 29 in the end wall 23 at a position adjacent the upper end of the tank. An incoming conduit or tile 31 extends into the wall through the opening 29.

The baffle 13 which divides the tank is provided with an upper opening 33 which is somewhat below the level of the incoming line 31 and is adjacent but below the liquid level of the treating tank. This opening 33 communicates with a duct 35 which conducts liquid passing from zone "A" to zone "B" downwardly and directly into the lower portion of the settling zone "B" and into the region of a sludge return means to be hereinafter described. The illustrated duct 35 is a generally rectangular passageway defined by concrete walls 36.

The settling compartment "B" also includes an effluent discharge opening 37, in the end wall 25, which is generally slightly below the level of the inlet opening 29 in the wall 23. The discharge opening 37 is connected to an outlet conduit 38. If desired, the conduit 38 may lead to a filter bed, as illustrated in our prior application, Serial No. 551,053.

The bottom of the settling section B slopes toward the sludge return means and comprises three sections 39a, 39b, and 39c, each of which extend from a wall of the tank 11 downwardly and inwardly to the sludge return means. Thus, the lower edges of the side walls converge at their lower ends.

The aerating means 15 which is disposed partly within the tank 11 is operable to introduce air into the fluid waste material in the tank, and this mechanism comprises a motor 41 supported on the tank top 27, a rotatable hollow shaft 43 extending downwardly into the tank 11 and driven by the motor 41 through a belt and pulley arrangement 45, and a pair of arms 47 which project radially from the lower end of the shaft 43. The hollow shaft 43 is open to the atmosphere at its upper end. In the illustrated embodiment, a vent pipe 44 extends from an opening 46 in the top 27. The vent pipe relieves any gas pressure which may develop in the tank during its operation.

In order to afford automatic operation of the aerating means 15 at predetermined intervals and for selected periods of time, a timing mechanism (not illustrated) may be provided in the electrical circuit for operating the motor 41. Such timing mechanism may include suitable means (not shown) which are commercially available to provide for selection of the length of the period of operation of the motor as well as selection of the interval between such periods of operation. In this way, the aerating means 15 can be automatically put into operation at selected intervals for a selected period of time, in order to satisfy the conditions existent at each installation with respect to the amount of waste material being handled and the B.O.D. content of such material.

The top 27 of the tank is provided with a circular opening 49 for receiving the aerating means 15. The opening is preferably centrally located with respect to the compartment "A." A cover plate 51 is bolted or otherwise secured over the opening 49. The cover plate 51 carries a thrust bearing 53 which supports the shaft 43.

Secured to the lower side of the cover plate 51, by means of a suitable flange 55, is a tube 57 which extends substantially the length of the shaft 43, concentrically therewith and provides a liquid-tight enclosure for the shaft. An intermediate bearing and a lower end bearing (not illustrated) journal the shaft 43 within the tube 57.

The lower end of the shaft 43 has fixed thereto a hub 59 which includes a hollow central portion which communicates with the hollow center of the shaft 43. This hub has diametrically opposed threaded openings 43a therein which receive threaded inner ends of the arms 47 to fix the latter in position at the lower end of the shaft 43.

The inner portion or main body of each of the arms 47 is essentially streamlined in cross-section, so as to provide as little resistance as possible to the movement of the arm through the waste material. The outer portion of each arm 47 is of flattened cross-section so as to form an agitator blade or vane 48. Each of the rotor arms 47 is hollow throughout its length and includes a passageway 50 which extends from the hub end of the arm to openings 52 near the outer end of the arm. Thus, there is provided fluid communication between the atmosphere and the fluid in the tank adjacent the ends of the arms 47 through the shaft 43, hub 59, passageways 50 and openings 52 in the arms 47. A more detailed description of these arms 47 may be found in our co-pending application Serial No. 551,053.

Attached to the tube 57 is a recirculating or draft tube 61, which is preferably formed with a funnel-like upper lip portion 63 and a circumferentially-flanged, lower end portion 65. Suitable brace means provide attachment with the upper and lower portions, respectively, of the tube 57, at positions such that the upper end of the draft tube 61 is preferably slightly below the level of the fluid waste material in the tank 11 when the liquid is quiescent.

A circular plate 67 is adjustably positioned below the arms 47 a predetermined distance and this spacing and relative position are maintained by a plurality of spacing members 69 which connect the plate 67 and the flange 65. The spacing members illustrated are threaded elements which are secured to the flange 65 and plate 67 by nuts 66. The position of the nuts 66 on the elements may be changed to adjust the spacing between the flange and plate. The spacing members 69 may also be short pieces of metal rod or may be narrow U-shaped pieces. The spacing members 69 preferably occupy only a small amount of the space between the flange 65 and the plate 67 so that fluid may flow freely between the flange and plate.

The plate 67 has an opening 71 centrally positioned therein and a short neck or coupling 73 about the opening extends downwardly therefrom. The sludge return means 74 communicates between the settling zone and aerating means through this coupling 73. The sludge return means comprises a sludge-return pipe 75 which extends upwardly into the coupling 73. The pipe 75 extends from the coupling 73 through an opening in the lower portion of the wall 13 to the bottom portion of the settling zone "B." The aerating means 15, in addition to aerating the waste material, pumps or draws liquid sludge through the return pipe 75.

The duct 35 directs the liquid passing from zone "A" to zone "B" downwardly into the lower portion or collecting region of the settling compartment "B" toward the sludge return pipe 75.

By directing the liquid from zone "A" downwardly in the settling zone "B" toward the region of the return pipe 75 and by drawing the liquid sludge through return pipe 75, a circulation is established which effects a better settling of the solid particles and a better return of the solid particles to the treatment zone "A." It is important that the sludge return pipe 75 and the duct 35 be proportioned to minimize any floating of sludge in settling zone "B" so as to prevent scum on this zone.

The sludge particles moving through recirculation line 75 are passed upwardly into the region of the rotor arms 47. This arrangement provides for the upward re-entry into the treating zone "A" of the sludge particles which collect in the lower part of the settling zone "B" directly into the zone of the rotor arms 47, as will be more fully described later in the description. A steel plate 77 for supporting the sludge return line 75 is provided on the tank floor.

Due to the action of the aerating means, when treating some waste materials, some of the solids in the waste material may become so buoyant as to avoid collection in the sludge return pipe 75. Therefore, such solids tend to float to the top of the settling zone "B" and form scum which may pass out through the effluent line. To avoid such scum a screen or grid 79 is provided above and about the outlet from the duct 35. This screen or grid traps the buoyant solids and keeps them submerged until they lose their buoyancy or become digested. The screen or grid is fitted about a suitable frame 79 which is secured to the partition wall 13. The openings in the screen or grid should be sufficiently small to entrap a substantial portion of the buoyant solids. A ¼" sq. mesh screen has proved satisfactory but screens of from about ¼ sq. in. mesh to about ½ sq. in. mesh may be employed.

In order to reduce the amount of buoyant particles that may flow into the effluent line 38, a collecting weir 83 is provided. This weir is attached to the side 25 of the tank 11 so that its upper edge is somewhat above the lower edge of the outlet opening.

Alternate means for avoiding the accumulation of scum in the settling zone B is shown in FIGURES 4 and 5. Since the illustrated arrangement is generally similar to the embodiment shown in FIGURES 1 and 2 corresponding parts are similarly numbered but are differentiated by the symbol prime ('). As shown in FIGURES 4 and 5, the alternate means comprises a scum return assembly 84 and baffle 86 in front of the outlet 37'. The scum return assembly 84 connects to the upper portion of the draft tube 61', below the lip 63', extends laterally from the draft tube through the wall 13', and thence upward to a funnel-shaped scum inlet 85. The scum inlet 85 is preferably slightly below the liquid level of the settling zone B'.

Upon operation of the motor 41', there will be an agitation of the liquid in the treating zone A' which draws the liquid down through the draft tube 61'. This causes a siphon or aspiratory effect on the scum return assembly 84 to thereby draw material from scum inlet 85 into the draft tube 61' and downwardly through the region of the rotating arms 47'.

The amount of material returned to the treating zone A' is dependent upon the cross-sectional area of the scum return assembly 84 and the amount of liquid being drawn downward in the draft tube 61'. Any scum that accumulates on the top of the liquid in the settling zone B' is removed in this manner.

To further aid in preventing scum from entering the effluent line 38' an outlet baffle 86 is placed in front of the outlet 37'. Arranging the baffle in this way allows clear effluent to flow through the effluent line 38', from a point in the settling zone B' below the surface of the liquid.

Figure 2:
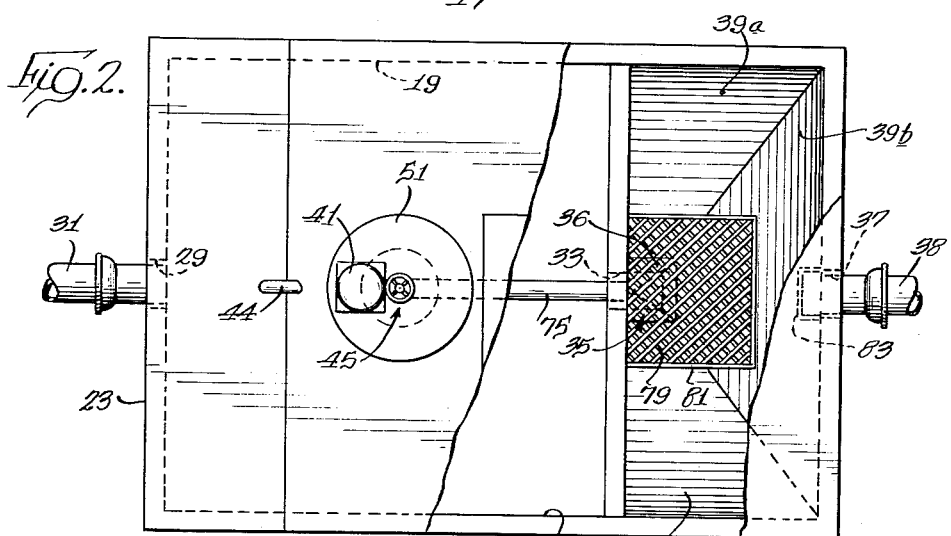
FIGURE 2 is a plan view of the apparatus in FIGURE 1, with portions broken away to illustrate certain details of construction.
Figure 3:
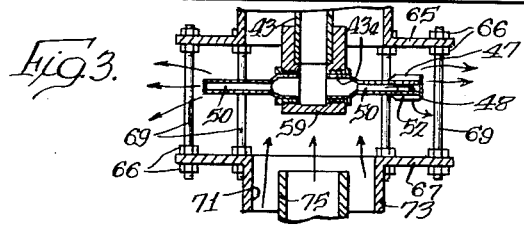
FIGURE 3 is an enlarged sectional view of a portion of the structure in FIGURE 1.

It is seen, therefore, that in the described embodiment of FIG. 1, the fluid waste material enters the tank 11 through the pipe 31. The level of the fluid waste in the treating zone "A" in the tank 11 will, under a condition of quiescence of the liquid in the tank, assume the level of the collecting weir 83, provided the pipe 38, and weir 83, which is preferably disposed on the far side of the tank with respect to the inlet opening 29, is at a level somewhat lower than the inlet.

Upon operation of the motor 41 to effect rotation of the arms 47, there will be an agitation of the liquid in the tank which provides a downward surge of liquid in the draft tube 61 and also creates a flow from the treating zone "A" through the duct 35 to the settling zone "B." The agitation of the liquid is also adequate to set up a scouring action on the tank bottom and side walls to thereby eliminate any quiescent zone where septicity might otherwise be established.

As the above-mentioned circulation through the draft tube 61 occurs, the fluid within the tube upon reaching the rotating arms 47 is moved outwardly with respect to the center of rotation and the motion of the fluid and the rotating arms 47 causes sludge to be drawn through the pipe 75 from the lower end of the settling zone "B" into the region of the rotating arms 47. In this manner, the solid particles which have settled at the bottom of the settling zone "B" are returned to the treating zone "A" for further treatment. The amount of solid materials thus returned to the treating zone "A" depends, in part, on the volume of fluid passing from the treatment zone "A" into the settling zone "B." The amount of fluid circulation afforded between the settling zone "B" and treating zone "A" is also dependent upon the size of the pipe 75 and the position of the plate 67. As the plate 67 is moved towards the rotor arms 47 the pumping effect increases.

As the motor 41 operates to effect rotation of the shaft 43 through the belt-pulley drive indicated generally at 45, the rotor arms 47 submerged in the liquid waste material in the tank are rotated at a relatively high speed. This rotation of the arms 47 is accompanied by a flow of air downwardly through the hollow shaft 43 and then through the hollow center of the arms to the openings at the end of each arm. The air is preferably introduced into the waste material under conditions believed to involve a cavitation effect. This air provides oxygen for the aerobic bacteria existing in the material being treated, and promotes the purification of the waste through satisfaction of the B.O.D. content, as well as decomposition of the organic solid materials into unobjectionable forms, such as sulfates and nitrates. To accomplish the highly efficient aeration characteristic of the operation of the apparatus in accordance with the invention, the rotor should be operated at a linear speed in the region of the agitation vanes within the range of from about 30 to 50 feet per second, thereby introducing air at the rate of from about 1.5 cubic feet per minute to about 1.8 cubic feet per minute.

It will be understood, of course, that the embodiment of FIG. 4 also operates generally in the manner described with respect to the embodiment of FIG. 1, with the additional functioning of the scum return assembly 84 as described.

The present invention avoids the deficiencies noted above with respect to septic tanks, generally through the treatment of the sewage or other waste in a manner affording oxidation of the active components thereof to stable forms, such as sulfates and nitrates, and the resulting provision of a clear effluent, both of which may be safely disposed of without further treatment. The treatment afforded is essentially aerobic, with oxygen being supplied to the fluid waste material to provide for the necessary conversion to unobjectionable matter.

The efficient and rapid dissolution of oxygen into the waste materials in the present invention and the constant re-circulation of the materials through the oxygenation zone, while retaining such materials in the tank, insures a supply of sufficient oxygen to achieve the proper, aerobic conversion of the waste materials, both liqiud and solid, to unobjectionable matter having a safe B.O.D.

The complete oxidation of the organic solids avoids the need for periodic emptying of the tank, except for the very slow accumulation of inorganic solids such as sand, dirt and the like, as opposed to the ordinary septic tank or aerator where the sludge must be put in a digester or otherwise treated after removal from the tank before it can be safely dumped into a water course or other point of disposal.

In a particular embodiment of this invention, which has been successfully tested over a period of several months, a rectangular tank 5 feet deep, 3 feet wide and 6 feet long was used. The wall 13, separating the holding zone "A" from the settling zone "B," was positioned 4 feet 8 inches from the wall containing the tank inlet and 4 inch openings were used for the inlet and outlet as well as the communicating opening between the two compartments. The duct 35 was 4 inches on a side so that it had a cross sectional area of 16 square inches. The pipe 75 was a 1½ inch pipe. The lower end of the duct was about one foot from the entrance to the pipe 75.

The rotor arms 47 extended, end to end, a distance of 6 inches and were submerged 3 feet 4 inches below the normal level of the liquid in the tank, which was about 4 feet from the bottom. The rotor arms 47 were designed to provide during operation of the rotor an air inflow of about 1.7 cubic feet per minute, using a ¾ inch pipe for the air intake 43 and an internal passageway within the rotor arms of about .125 square inch cross sectional area.

Operating the rotor was a ⅓ horse-power motor operating at 1200 r.p.m., and the motor was timed to operate 15 minutes out of each hour, to thereby deliver a total of about 600 to 700 cubic feet of air for each 24 hour period. The power consumption amounted to about 1.0 to 1.5 k.w.h. for delivering this amount of air to the waste material, and the peripheral speed of the rotor vanes during operation was approximately 1800 feet per minute. Intermittent or periodic operation of the air-introducing mechanism 15, as employed in this apparatus, permits more effective settling of the solids in compartment "B," but a lower powered, continually operating mechanism might possibly be used to advantage in some instances.

The material entering the tank was domestic sewage from a household of five adults and included ground garbage and the usual laundry drainage of water containing soaps and detergents. It was found that approximately 1.5 pounds of B.O.D. and about 1.0 pound of settleable organic solids could be treated in an average 24 hour period, with a power consumption of from about 1.45 to 1.50 k.w.h. As will be noted from the previous discussion of the air inflow requirements, about one-fourth of the air inflow is used for purification, i.e., to provide a safe effluent with a low B.O.D. content, and the remainder of the air inflow is utilized to achieve a complete oxidation of the organic solids in the treating tank.

The results noted with this installation were extremely satisfactory in that the effluent from the tank was clear and free of any objectionable materials and could be safely disposed of above ground level. The average B.O.D. removal was from 85 to 90 percent of the total B.O.D. present in the inflow. Further, the solids remaining in the tank were oxidized and consisted primarily of fully reacted, safe and harmless materials. Consequently, the solids could be safely dumped without any danger to health and without creating offensive odors.

It will be understood, however, that a tile field can be used if desired, but generally it is unnecessary. Also, for appearance sake, it may be desirable to place a unit of this type, or at least a major portion thereof, below the ground level.

It will be apparent to those familiar with this art that in the event of a power failure the tank 11 can function as a septic tank and provide equivalent action.

The present invention provides a novel method and apparatus for handling liquid waste materials, and especially waste materials which are produced in relatively small amounts, as for example, the waste materials produced daily in the average home. The invention makes possible the successful treatment of small volumes of waste materials to produce a purified, safe effluent and a substantially innocuous residual sludge. Further, this is accomplished by the use of economical amounts of power. The advantages of the invention, both from the public health viewpoint, and from the economic viewpoint, are manifest.

Various of the features of the invention believed to be new are set forth in the accompanying claims.

We claim:

1. Apparatus for treating liquid-borne waste materials comprising a vessel having an inlet opening arranged to receive the material to be treated, an outlet opening, a settling compartment having fluid communication with the outlet of said vessel and having an effluent discharge opening, a rotor located below the normal liquid level in said vessel, said rotor including a main central body portion including a plurality of vane elements spaced from the axis of the rotor and extending at right angles to the plane of rotation of said rotor to project beyond the opposite surfaces of the main body of the rotor, means operable to rotate said rotor to produce a region of cavitation in the wake of said vane elements, means for introducing air directly into said region of cavitation by conducting air in gaseous form to the trailing edges of said vane elements, said air introducing means comprising a hollow shaft connected to said rotor and means defining a passageway in said rotor main body from the interior of said shaft to a region immediately behind said vanes, means providing fluid communication between the lower portion of said settling compartment and said region of cavitation at a position below said rotor to thereby direct solids settled in said lower portion of the settling compartment directly upwardly into said region of cavitation.

2. Apparatus for treating liquid-borne waste materials comprising a vessel having an inlet opening arranged to receive the material to be treated, an outlet opening, a settling compartment having fluid communication with the outlet of said vessel and having an effluent discharge opening, a rotor located below the normal liquid level in said vessel, said rotor including a main central body portion including a plurality of vane elements spaced from the axis of the rotor and extending at right angles to the plane of rotation of said rotor to project beyond the opposite surfaces of the main body of the rotor, means operable to rotate said rotor to produce a region of cavitation in the wake of said vane elements, means for introducing air directly into said region of cavitation by conducting air in gaseous form to the trailing edges of said vane elements, said air introducing means comprising a hollow shaft connected to said rotor and means defining a passageway in said rotor main body from the interior of said shaft to a region immediately behind said vanes, a draft tube generally concentric with said hollow shaft and extending from a position adjacent the liquid level in said said vessel to a position above and adjacent to the path of said rotor, means providing fluid communication between the lower portion of said settling compartment and said region of cavitation at a position below said rotor to thereby direct solids settled in said lower portion of the settling compartment directly upwardly into said region of cavitation.

3. Apparatus for treating liquid-borne waste materials comprising a vessel having an inlet opening arranged to receive the material to be treated, an outlet opening, a settling compartment having fluid communication with the outlet of said vessel and having an effluent discharge opening, a rotor located below the normal liquid level in said vessel, said rotor including a main central body portion including a plurality of vane elements spaced from the axis of the rotor and extending at right angles to the plane of rotation of said rotor to project beyond the opposite surfaces of the main body of the rotor, means operable to rotate said rotor to produce a region of cavitation in the wake of said vane elements, means for introducing air directly into said region of cavitation by conducting air in gaseous form to the trailing edges of said vane elements, said air introducing means comprising a hollow shaft connected to said rotor and means defining a passageway in said rotor main body from the interior of said shaft to a region immediately behind said vanes, and a sludge return pipe disposed in the lower portion of said vessel to provide fluid communication between the lower portion of said settling compartment and said region of cavitation at a position below and adjacent to said rotor, whereby the operation of said rotor is effective to draw solids settled in said lower portion of the settling compartment directly upwardly into said region of cavitation.

References Cited in the file of this patent
UNITED STATES PATENTS 1,139,024    Frank  _____ May 11, 1915

(Other references on following page)

UNITED STATES PATENTS

| | | |
|---|---|---|
| 1,319,667 | Kraut et al. | Oct. 21, 1919 |
| 1,365,278 | Ruth | Jan. 11, 1921 |
| 1,757,263 | Sims | May 6, 1930 |
| 1,902,078 | Jenks | Mar. 21, 1933 |
| 2,094,004 | Drake | Sept. 28, 1937 |
| 2,293,183 | Walker | Aug. 18, 1942 |
| 2,394,413 | Walker | Feb. 5, 1946 |
| 2,515,538 | Wall | July 18, 1950 |
| 2,573,941 | Walker et al. | Nov. 6, 1951 |
| 2,597,802 | Kappe | May 20, 1952 |
| 2,889,047 | Coate | June 2, 1959 |

FOREIGN PATENTS

| | | |
|---|---|---|
| 466,743 | Germany | Oct. 12, 1928 |